UNITED STATES PATENT OFFICE.

FRIEDRICH ALBERT REICHMANN AND CARL AUGUST LAGERQVIST, OF VARBERG, SWEDEN.

PROCESS OF MERCERIZING SHORT-STAPLE COTTON.

SPECIFICATION forming part of Letters Patent No. 682,494, dated September 10, 1901.

Application filed September 13, 1900. Serial No. 29,953. (No specimens.)

*To all whom it may concern:*

Be it known that we, FRIEDRICH ALBERT REICHMANN and CARL AUGUST LAGERQVIST, subjects of the King of Sweden and Norway, residing at Varberg, Sweden, have invented a certain useful Process for Imparting a Silky Luster to American or Short-Staple Cotton, of which the following is a specification.

The known mercerizing processes of Thomas and Prevost, Lieberman, Lowe, and others can only be employed for long-staple or Egyptian cotton, which has a certain luster in itself. When applied to American or short-staple cotton, the known processes, which substantially consist in treating the fibers with concentrated machine-lyes in a state of tension, produce no result, or, at least, one that is unsatisfactory. A very good result is obtained, on the other hand, if the cotton be freed from fatty matter (or grease) and well soaked in concentrated alkaline lye and then steeped in a state of tension in a hot concentrated caustic soda-lye strongly mixed with copper-oxid ammonia until a deep-blue coloring appears and thereupon washed and neutralized. The washing and neutralizing cause the blue coloring to disappear. Thereafter the cotton has a weak gloss. In order to make this more effective, the cotton is allowed to lie in concentrated nitric acid (35° Baumé) at the most 15° centigrade temperature until a sample taken from it is of a pale-yellow color, whereupon it is squeezed out (not wrung out) and thoroughly washed with water. The dried cotton then shows a gloss like Turin silk that has been boiled. When the cotton is so treated, the dyeing with light colors may be proceeded with without any previous bleaching.

Instead of treating the cotton simultaneously with soda-lye and copper-oxid ammonia it may be treated separately with both. Otherwise the process is as described. It should, however, be remarked that with this method of carrying out the process greater attention is requisite, as otherwise the cotton very quickly dissolves entirely, whereas only the outside should be affected. For the subsequent treatment hydrochloric acid or sulfuric acid may be employed instead of nitric acid.

The neutralizing after the treatment with caustic soda-lye and copper-oxid ammonia is effected with the cotton still in a state of tension with the assistance of cold water, which is acidified with nitric acid. In this way subsequent shrinking is prevented.

What we claim, and desire to secure by Letters Patent, is—

A process for imparting a silky luster to American or short-staple cotton either in the yarn or in the piece, consisting in boiling and well-soaking the cotton in concentrated alkali-lye until free from grease or fat, then treating it in a state of tension with concentrated caustic soda-lye and copper-oxid ammonia until it is of a dark-blue color, then washing and neutralizing and finally allowing it to lie in highly-concentrated nitric acid until it is of a pale-yellow color, whereupon it is squeezed and well washed.

In witness whereof we have hereunto set our hands in presence of two witnesses.

FRIEDRICH ALBERT REICHMANN.
CARL AUGUST LAGERQVIST.

Witnesses:
WILHELM KÖNIG,
KARL TIERWERG.